United States Patent
Ali et al.

(10) Patent No.: US 12,321,756 B2
(45) Date of Patent: Jun. 3, 2025

(54) DISABLING SOFTWARE PERSISTENCE

(71) Applicant: Hewlett-Packard Development Company, L.P., Spring, TX (US)

(72) Inventors: Valiuddin Ali, Spring, TX (US); Richard Bramley, Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 418 days.

(21) Appl. No.: 17/293,025

(22) PCT Filed: May 17, 2019

(86) PCT No.: PCT/US2019/032810
§ 371 (c)(1),
(2) Date: May 11, 2021

(87) PCT Pub. No.: WO2020/236133
PCT Pub. Date: Nov. 26, 2020

(65) Prior Publication Data
US 2022/0066784 A1    Mar. 3, 2022

(51) Int. Cl.
*G06F 9/4401* (2018.01)
*G06F 8/65* (2018.01)
*G06F 9/445* (2018.01)

(52) U.S. Cl.
CPC ............... *G06F 9/441* (2013.01); *G06F 8/65* (2013.01); *G06F 9/445* (2013.01)

(58) Field of Classification Search
CPC ............ G06F 9/441; G06F 8/65; G06F 9/445
See application file for complete search history.

(56) References Cited

U.S. PATENT DOCUMENTS

| | | |
|---|---|---|
| 7,926,106 B1 | 4/2011 | Kenney et al. |
| 8,171,272 B1 | 5/2012 | Chester et al. |
| 8,589,902 B2 | 11/2013 | Jones et al. |
| 9,213,661 B2 | 12/2015 | Coneski et al. |
| 9,681,251 B1 | 6/2017 | Ahn et al. |
| 9,904,543 B2 | 2/2018 | Stewart et al. |

(Continued)

FOREIGN PATENT DOCUMENTS

| | | |
|---|---|---|
| CN | 104813329 A | 7/2015 |
| TW | I639090 B | 10/2018 |

OTHER PUBLICATIONS

Yosuke Chubachi et al., "Hypervisor-based Prevention of Persistent Rootkits", 2010, Association for Computing Machinery, pp. 214-220.

(Continued)

*Primary Examiner* — Hyun Soo Kim
(74) *Attorney, Agent, or Firm* — Knobbe, Martens, Olson & Bear, LLP

(57) ABSTRACT

An example computing device includes a storage device, a random-access memory, a read only memory, and a processor. The processor is to determine, during a booting process, whether an operating system being booted is a primary operating system, in response to a determination that the operating system being booted is different from the primary operating system, determine whether the operating system being booted satisfies a first criteria, and, in response to a determination that the operating system being booted fails to satisfy the first criteria, disable software persistence.

14 Claims, 4 Drawing Sheets

(56) References Cited

U.S. PATENT DOCUMENTS

| | | |
|---|---|---|
| 2004/0221194 A1 | 11/2004 | Denninghoff et al. |
| 2005/0216757 A1 | 9/2005 | Gardner |
| 2006/0143606 A1 | 6/2006 | Smith et al. |
| 2008/0162914 A1* | 7/2008 | Adrangi ................ G06F 9/441 713/2 |
| 2010/0211769 A1* | 8/2010 | Shankar ............. G06F 9/45533 718/1 |
| 2011/0041142 A1* | 2/2011 | Lin ................... G06F 9/45545 719/319 |
| 2011/0055535 A1* | 3/2011 | Verdy ..................... G06F 8/61 713/100 |
| 2014/0143530 A1* | 5/2014 | Martinez .............. G06F 21/566 713/2 |
| 2014/0292776 A1* | 10/2014 | Tanaka ................... G06F 3/038 345/520 |
| 2014/0325665 A1 | 10/2014 | Duca |
| 2014/0337610 A1 | 11/2014 | Kawano et al. |
| 2019/0018964 A1 | 1/2019 | Basehore et al. |
| 2019/0026140 A1 | 1/2019 | Mahajan et al. |
| 2019/0042754 A1* | 2/2019 | Jreij ..................... G06F 21/575 |
| 2019/0166501 A1* | 5/2019 | Debates ................ H04W 12/12 |
| 2021/0373905 A1* | 12/2021 | Sayyed ................ G06F 9/4401 |

OTHER PUBLICATIONS

Patrick Wardle, "Methods of Malware Persistence on MAC OS X", Sep. 2014, Virus Bulletin Conference, pp. 14-24.

\* cited by examiner

DISABLING SOFTWARE PERSISTENCE

BACKGROUND

In a computing environment, it may be desired to ensure a certain program, application, or the like is available for execution by an operating system. For example, it may be desired to ensure the operating system is provided with anti-theft software, anti-malware software, a specific driver, or the like. Accordingly, the computing environment may include the ability to ensure persistence of the certain program or application by automatically installing the program or application. However, there may be occurrences when it is desired to avoid such persistence.

BRIEF DESCRIPTION OF DRAWINGS

Certain examples of the present disclosure will be more apparent from the following description taken in conjunction with the accompanying drawings, in which.

Throughout the drawings, it should be noted that like reference numbers are used to depict the same or similar elements, features, parts, components, and structures.

DESCRIPTION OF EXAMPLES

Figure 1:
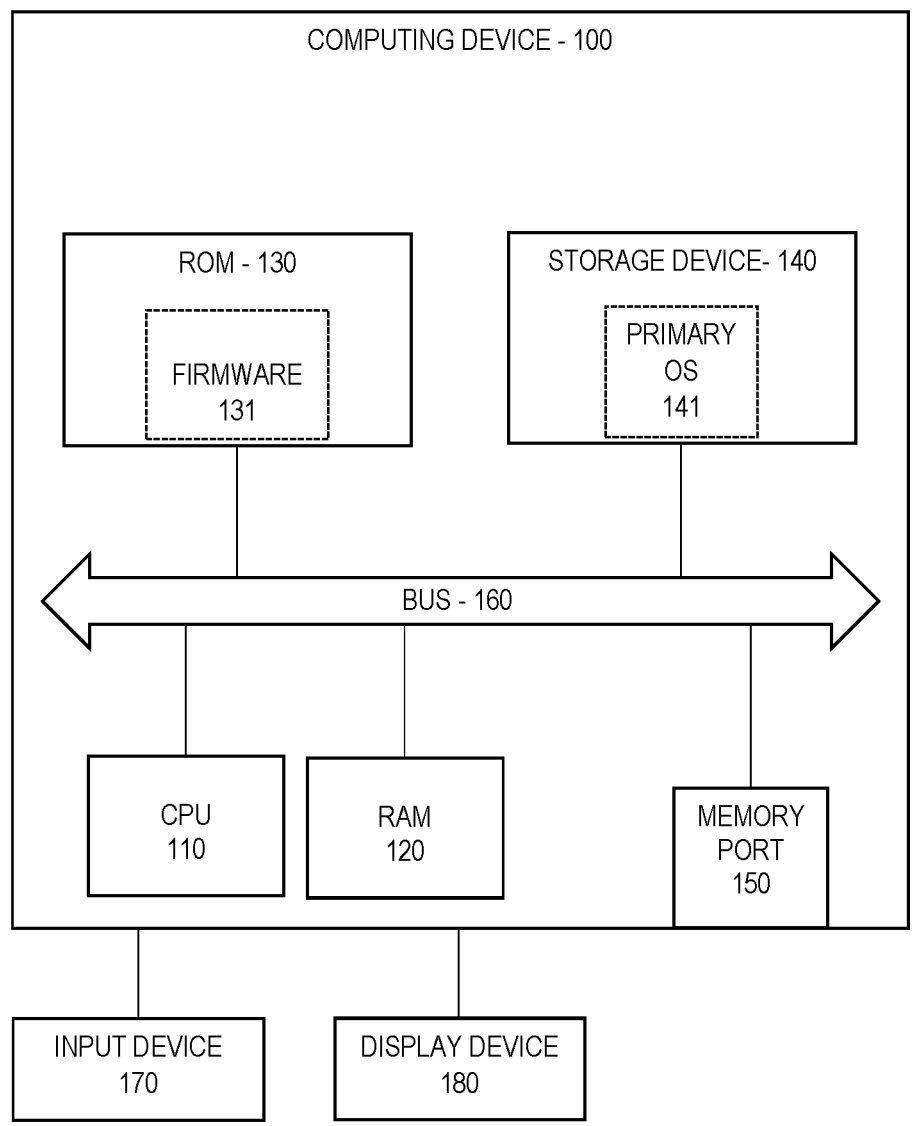
FIG. 1 illustrates a computing device in which software persistence may be selectively disabled according to an example.

Various examples are described more fully hereinafter with reference to the accompanying drawings. The examples described hereinafter may be modified in many different forms.

Throughout the description, when an element is referred to as being "connected" or "coupled" to another element, it can be directly connected or coupled to the other element, or can be connected or coupled to the other element with intervening elements interposed therebetween.

In the following description, a singular expression includes a plural expression, unless otherwise specified. It is also to be understood that terms such as "comprises" or "includes" are used herein to designate the presence of a characteristic, a number, a step, an operation, an element, a component, or a combination thereof, and not to preclude the presence or the possibility of adding one or more of other characteristics, numbers, steps, operations, elements, components, or a combination thereof. It is also to be understood that terms such as "first," "second," or the like are used to differentiate between objects having the same or similar terminology and are in no way intended to represent an order, unless where explicitly stated otherwise.

A computing device, such as a personal computer (PC), a laptop computer, a tablet, a mobile terminal, or the like may include the ability to ensure the persistence of desired software. Such software may be implemented using processor executable instructions and may include or relate to any of various programs, applications, drivers, or the like. For example, it may be desired to ensure that anti-theft software, anti-malware software, software for a specific driver, or the like is persistently installed and available on the computing device.

To ensure the installation and availability of the desired software, firmware that is executed upon start-up or booting of the computing device, such as basic input-output system (BIOS) software or unified extended firmware interface (UEFI) software, may include an embedded program corresponding to the desired software. When the computing device is booted, the system firmware (e.g., BIOS, UEFI, etc.) locates and prepares the embedded program for exposure to an operating system (OS) of the computing device. As the computing device continues to boot, the OS locates and executes the exposed program and writes the program to the memory in which the OS is stored. Thus, even if the program is subsequently deleted from the memory in which the OS is stored, a re-boot of the computing device again results in the program being exposed, located, executed, and stored by the OS, which results in persistence of the desired software.

As an example, in a computing device that operates using the Windows™ OS, the firmware may include embedded software in the form of a native mode application (i.e., a platform binary). When the computing device is booted, the firmware copies the platform binary to a location in the physical memory of the computing device and creates a windows platform binary table (WPBT). The WPBT is a fixed advanced configuration and power interface (ACPI) table that includes a physical address pointer that indicates the location in the physical memory of the platform binary. As the booting process continues, the OS reads the WPBT to determine the physical memory address of the platform binary, obtains and executes the platform binary, and writes the platform binary to the storage location from which the OS was launched. For example, if the OS was launched from a storage device of the computing device, the platform binary is written to the storage device. This allows the OS to reclaim the storage location in the physical memory. Using this process, persistence of the desired software is ensured every time the computing device is booted.

However, there may be occurrences in which persistence of the software is not desired. For example, the computing device may be taken for diagnostic testing and may be booted using a diagnostic OS. In that case, the firmware of the computing device may write the software to the disk that holds the diagnostic OS. As an example, in a case in which the computing device uses the Windows™ OS and the computing device is diagnosed using a WPBT enabled OS (i.e., Windows™ OS), the firmware will automatically extract and expose the desired software, such that the diagnostic OS will copy the software to the disk or other source that houses the diagnostic OS.

A concept of the present disclosure is to provide a mechanism and framework for selectively preventing the persistence of software. To selectively avoid software persistence, it may be determined whether the OS being booted is a primary OS of the computing device and a result of that determination may be stored for use by the OS and the firmware. As an example, it may be determined that the operating system being booted is different from the primary operating system and a result of that determination may be stored for use by the OS and the firmware. A primary OS of the computing device may be an OS that is installed on a storage device of the computing device, an OS that was most recently used to boot the computing device, an OS included in a list of bootable sources, an OS that is not located on an external source, or the like. Also, if the OS being booted is not the primary OS, a policy may be provided to determine whether persistence of the desired software should still be enabled for the OS being booted. Further, a mechanism may be provided by which the firmware will selectively disable the software persistence.

FIG. 1 illustrates a computing device in which software persistence may be selectively disabled according to an example.

Referring to FIG. 1, a computing device 100 may include a central processing unit (CPU) 110, a random-access memory (RAM) 120, a read-only memory (ROM) 130, a storage device 140, an external port 150, and a bus 60. The computing device 100 may further include an input device 170 and a display device 180, which may be provided externally to the computing device 100. Although not shown, the computing device 100 may further include additional devices, components, or the like, such as a power source to provide power to any or all of the illustrated components. In implementation, the computing device 100 may be a PC, a laptop computer, a tablet, a mobile terminal, or the like.

The CPU 110 may control overall operations of the computing device 100. For example, the CPU 110 may control a booting or launch of the computing device 100 and may control other components included in the computing device 100 such that an operation corresponding to a user input received through the input device 170 is performed. The CPU 110 may include arithmetic and logical components for controlling the computing device 100 and may be implemented as a standard processing device, a microprocessor, a microcontroller, a programmable integrated circuit, or the like. Also, the CPU 110 may be implemented as multiple CPUs, multiple core processors, or the like.

The RAM 120 is a volatile memory and may provide a main memory or a physical memory of the computing device 100. The RAM 120 may be implemented as dynamic RAM (DRAM), a synchronous DRAM (SDRAM), a double data rate fourth generation SDRAM (DDR4), or the like.

The ROM 130 is a non-volatile memory that is provided to store software for use when starting or booting the computing device 100. The ROM 130 may be implemented as a programmable ROM (PROM), an erasable programable ROM (EPROM), an electrically erasable programable ROM (EEPROM), a non-volatile RAM (NVRAM), a flash memory, or the like.

The ROM 130 may include firmware 131 which may be used for booting the computing device 100. In an example, the firmware 131 may include embedded software corresponding to an application, a program, a driver, or the like that is to persist on the computing device 100. As an example, in a case in which the computing device 100 uses the Windows™ OS, the firmware 131 may include a native mode application (i.e., a platform binary) that may be executed by a Windows™ Session Manager during OS initialization. In that case, during booting of the computing device 100, the firmware 131 may copy the native mode application to the RAM 120 and create a WPBT that includes an address of the native mode application in the RAM 120.

The storage device 140 is a non-volatile memory or storage device on which software, applications, programs, drivers, or the like may be stored. The storage device 140 may be implemented as a magnetic hard-disk drive (HDD) device, a solid-state drive (SSD) device, or the like. For example, if implemented as an HDD, the storage device 140 may be a parallel advanced technology attachment (PATA) storage device (i.e., an integrated drive electronics (IDE) or an enhanced IDE (EIDE) storage device), a serial ATA (SATA) storage device, a small computer system interface (SCSI) storage device, or the like. As another example, if implemented as an SSD, the storage device 140 may include a flash memory such as a NAND based flash memory or other semiconductor based memory. In an example, the storage device 140 has stored therein a primary operating system (OS) 141. The primary OS 141 may be implemented as Windows™ OS, mac™ OS, Linux™, or the like. During booting of the computing device 100, the primary OS 141 may be provided with embedded software from the firmware 131 to ensure persistence of a desired application, program, driver, or the like. In the example in which the computing device 100 uses the Windows™ OS, the firmware 131 creates a WPBT that includes an address in the RAM 120 to which an embedded native mode application has been copied. In that case, during booting of the Windows™ OS, the Windows™ Session Manager will obtain and execute the embedded native mode application and write the application to the storage device 140.

The external port 150 may provide a connection point for an external memory. The external port 150 may be implemented as a universal serial bus (USB) port, a secure digital (SD) port, a microSD port, or the like. In an example, an external memory device such as a portable USB device may be connected to the computing device 100 using the external port 150 to perform diagnostic testing. In that example, the external USB device may have stored thereon an OS that may be used to diagnose or otherwise test the computing device 100. The computing device 100 may include a plurality of external ports 150.

The bus 160 may provide an electrical connection between any or all of the CPU 110, the RAM 120, the ROM 130, the storage device 140, and the external port 150. Although the bus 160 is illustrated in FIG. 1 as a single bus, it may be implemented as a plurality of busses or other types of electrical connections. Furthermore, although not illustrated, the computing device 100 may include additional components or devices coupled between the bus 160 and the illustrated components.

The input device 170 may receive a user input and may be implemented as a keyboard, a mouse, a physical button, a touch screen, a camera, a microphone, or the like. The display device 180 may display information, such as a result of executing a program, a menu for a user selection, a graphical user interface (GUI), or the like and may be implemented as a liquid crystal display (LCD), a light emitting diode (LED) display, an organic LED (OLED) display, an active matrix OLED (AMOLED) display, or the like.

Although illustrated as separate components and devices, certain of the components and devices may be implemented as a single component or device. As an example, the input device 170 and the display device 180 may be implemented as a single touchscreen device performing the functions of both the input device 170 and the display device 180.

As described above, the computing device 100 may be booted using the firmware 131 and the primary OS 141. In that case, a program embedded in the firmware 131 may be obtained and executed by the primary OS 141 and stored on the storage device 140. This would ensure persistence of the embedded program at every booting of the computing device 100. That is, even if the program were deleted from the storage device 140, the program would again be executed and installed during a subsequent booting of the computing device 100. In a situation in which the computing device 100 were being booted using an OS that was not the primary OS 141, for example if the computing device 100 were being diagnosed using an OS stored on an external USB device connected to the computing device 100 using the external port 150, it may be desired to avoid persistence of the embedded program.

In examples of the present disclosure, the computing device 100 may selectively disable the software persistence. In an example, the software persistence may be selectively disabled by determining whether the computing device 100 is being booted using the primary OS 141. As an example, it may be determined whether the OS being booted is different from the primary OS 141. If the computing device 100 is not being booted using the primary OS 141, or if the OS being booted is different from the primary OS 141, it may be determined if the OS that is being used for booting the computing device 100 satisfies a criteria such that software persistence is enabled. If the OS that is being used for booting the computing device 100 fails to satisfy the criteria, the software persistence may be disabled.

Figure 2:
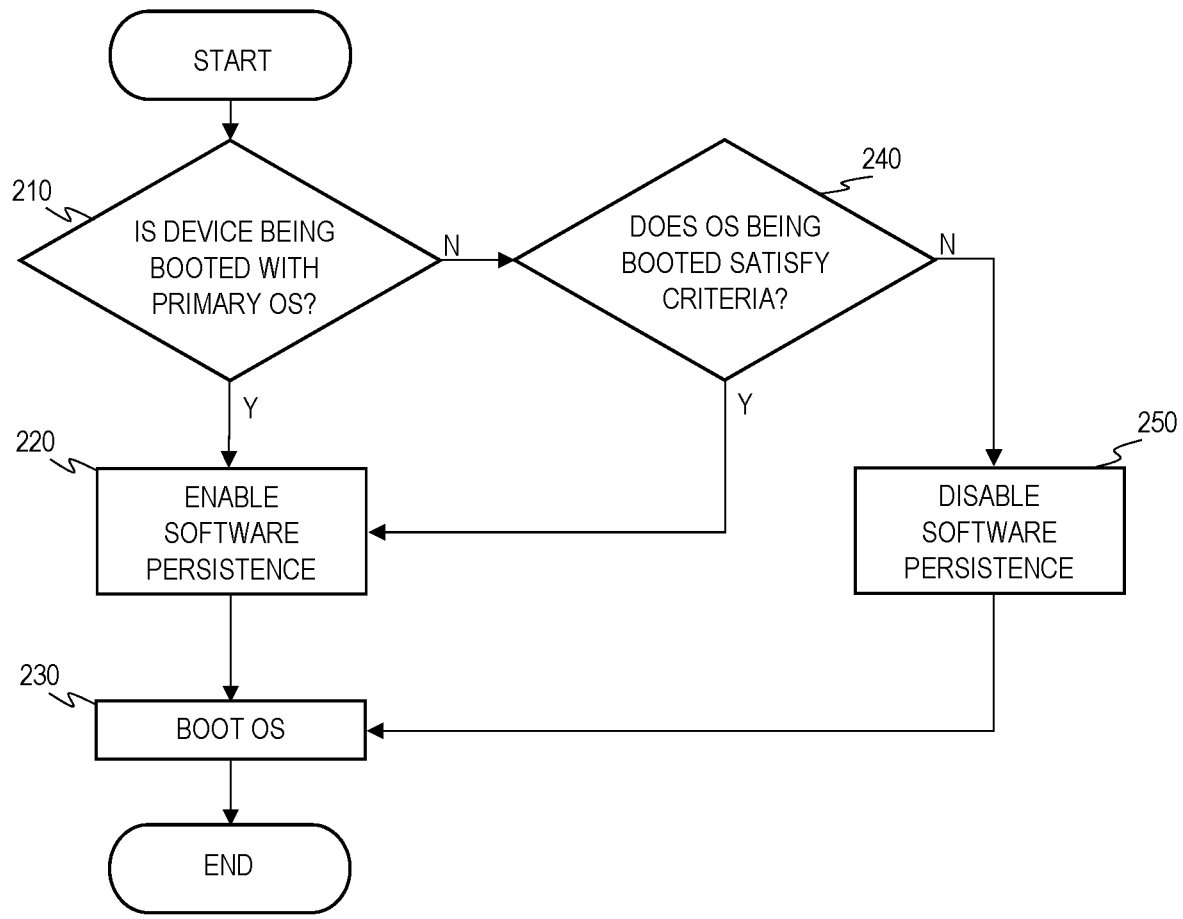
FIG. 2 illustrates a method of selectively disabling software persistence on a computing device according to an example.

FIG. 2 illustrates a method of selectively disabling software persistence on a computing device according to an example.

In examples of the present disclosure, it is determined if the computing device is being booted with a primary OS. To determine if the computing device is being booted with the primary OS, it is necessary to determine which OS constitutes the primary OS. Referring to FIG. 2, a primary OS of the computing device is determined in operation 205. In an example, it may be considered that an OS that is installed on a storage device of the computing device is the primary OS. In another example, an OS that was most recently used to boot the computing device may be considered as the primary OS. In another example, a computing device may include a list of bootable sources. In that case, the list of bootable sources could be evaluated to determine which bootable source is the primary OS. As an example, in a computing device using the Windows™ OS, a list of bootable sources is created which includes an entry labelled Windows Boot Manager. If the Windows Boot Manager is present, it may be considered as the primary OS. Alternatively, a first entry in the list of bootable sources, or a first entry in the list of bootable sources based on a local source (e.g., a non-USB based OS, a non-network based OS, etc.) may be considered as the primary OS. In yet another example, if the OS being booted is located on an external source (e.g., a USB based OS, a network based OS, etc.), it may be determined that the OS being booted is not the primary OS.

The determination of the primary OS in operation 205 may also include storing information about the primary OS, such as hardware information corresponding to a source of the primary OS, a device path corresponding to a location of the primary OS, or the like. The recorded information could be stored in the firmware, in the RAM of the computing device, in the storage device of the computing device, or the like.

Based on the determination of the primary OS in operation 205, it is determined whether the computing device is being booted with the primary OS in operation 210. As an example, it may be determined whether the computing device is being booted with an OS that is different from the primary OS. In the determining of whether the computing device is being booted with the primary OS of operation 210, the computing device may compare an OS that is being booted with the primary OS that was determined in operation 205. As an example, the computing device may compare stored information about the primary OS with information about the OS being booted. For example, if hardware information about the OS being booted matches stored hardware information about the primary OS, the computing device may consider that the OS being booted is the primary OS. In another example, if device path information of the OS being booted matches stored device path information of the primary OS, the computing device may consider that the OS being booted is the primary OS.

If it is determined in operation 210 that the computing device is being booted with the primary OS, software persistence is enabled in operation 220. As an example, when the computing device uses the Windows™ OS, the firmware may proceed with creation of a WPBT to expose an embedded program for execution and storage by the primary OS.

In operation 230, the computing device continues the booting process to launch the OS and begin operations.

On the other hand, if it is determined in operation 210 that the computing device is being booted with an OS that is different from the primary OS, it is determined in operation 240 if the OS being booted satisfies a criteria for enabling software persistence. As an example, it may be determined whether the OS being booted is located on an internal source, such as the storage device of the computing device, or on an external source, such as a USB based device. In this regard, information about the OS being booted, such as hardware information corresponding to a source of the OS being booted, a device path corresponding to a location of the OS being booted, or the like may be considered when determining if the criteria is satisfied. A user may set the criteria such that if the OS being booted is located on an external device, the criteria is not satisfied. Similarly, the user may set the criteria such that if the OS being booted is located on an internal location, the criteria is satisfied.

If it is determined in operation 240 that the OS being booted fails to satisfy the criteria for enabling software persistence, the software persistence is disabled in operation 250. As an example, the software persistence may be disabled using the firmware. For example, in the Windows™ OS, the firmware may prevent population of the WPBT with the address of the platform binary, may erase or otherwise remove information about the platform binary from the WPBT, or may remove a pointer to the WPBT from a main ACPI table such that the OS is not directed to use the WPBT. The process continues to operation 230 to continue the booting of the computing device.

On the other hand, if it is determined in operation 240 that the OS being booted does satisfy the criteria for enabling software persistence, the process continues to operation 220 in which software persistence is enabled and to operation 230 in which the computing device continues the booting process to launch the OS and begin operations.

Figure 3:
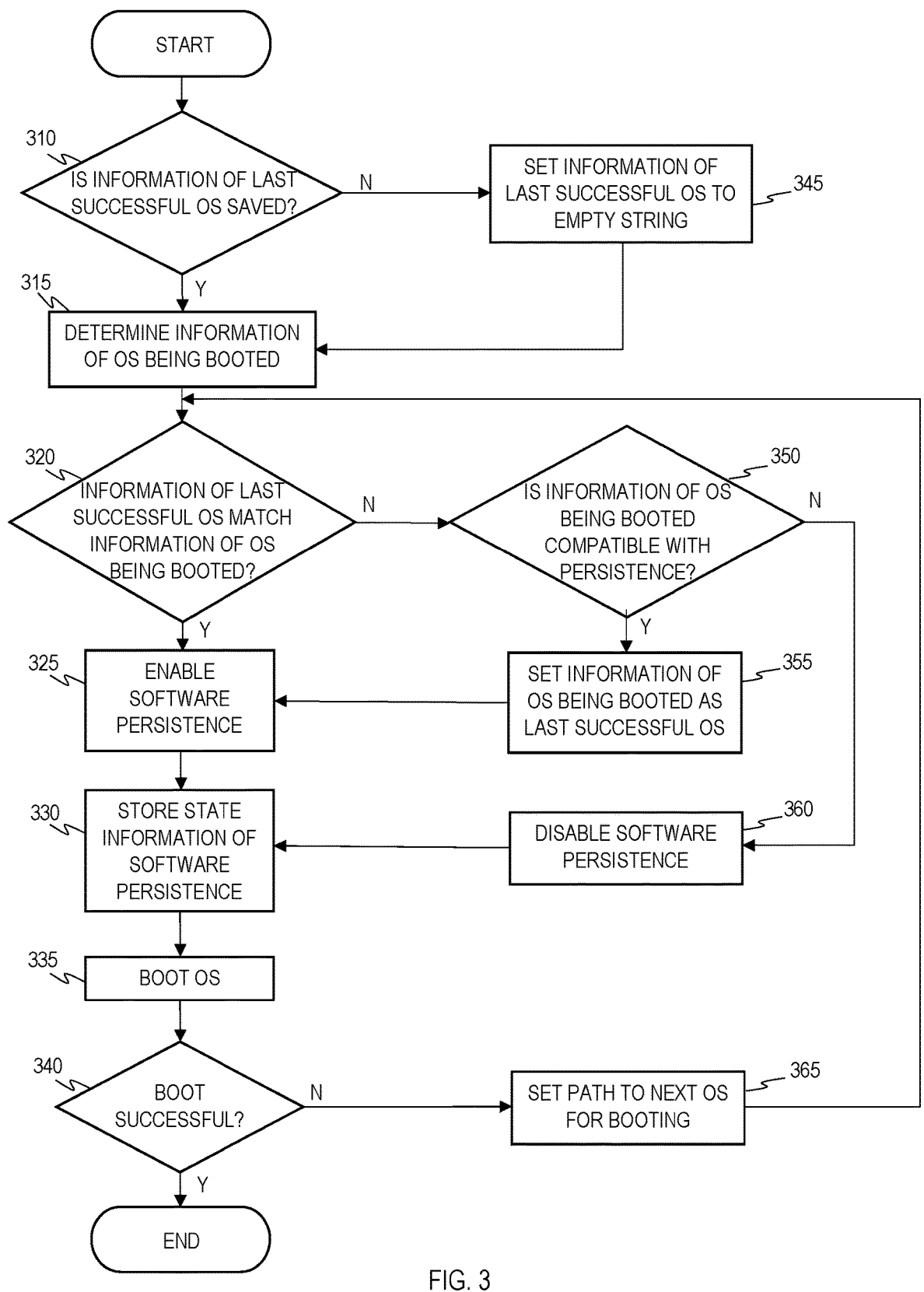
FIG. 3 illustrates a method of selectively disabling software persistence on a computing device according to an example.

FIG. 3 illustrates a method of selectively disabling software persistence in a computing device according to an example.

As described above with reference to FIG. 2, a computing device may determine a primary OS and store information about the primary OS. As an example, the computing device may store information such as hardware information corresponding to a source of the primary OS, a device path corresponding to a location of the primary OS, or the like. Using the stored information, it may be determined whether an OS being used to boot a computing device is a primary OS.

Referring to FIG. 3, the computing device may determine whether information of a last successful OS is saved in operation 310. As an example, the firmware of the computing device may determine if hardware information corresponding to a source of the last successful OS is saved. In another example, the firmware of the computing device may determine if a device path corresponding to a source of a last successful OS is saved. In an example, the information may be saved in the firmware, to a RAM of the computing device, to a storage device of the computing device, or the like.

If it is determined in operation 310 that the information of the last successful OS is saved, the computing device determines information of the OS being booted in operation 315. In operation 315, the computing device may determine information of the OS being booted that is similar to the saved information of the last successful OS. As an example, if the saved information of the last successful OS included hardware information corresponding to a source of the last successful OS, the computing device would determine hardware information corresponding to a source of the OS being booted. As another example, if the saved information of the last successful OS included device path information corresponding to a location of the last successful OS, the computing device would determine device path information corresponding to a location of the OS being booted.

On the other hand, if it is determined in operation 310 that the information of the last successful OS is not saved, the information of the last successful OS is set to an empty string in operation 345 and the process continues to operation 315 to determine the information of the OS being booted.

In operation 320, it is determined whether the information of the last successful OS matches the information of the OS being booted. If the information of the last successful OS matches the information of the OS being booted, it is considered that the OS being booted is the primary OS. In that case, the process continues to operation 325 in which software persistence is enabled.

On the other hand, if it is determined in operation 320 that the information of the last successful OS does not match the information of the OS being booted, it is considered that the OS being booted is not the primary OS. In that case, it is determined in operation 350 whether the information of the OS being booted is compatible with software persistence. As an example, it may be determined in operation 350 whether the OS being booted satisfies a criteria for enabling software persistence.

The criteria for enabling software persistence may be set by a user or a manufacturer of the computing device. As an example, the criteria may correspond with information concerning whether the OS being booted resides on an internal or external source of the computing device, whether the OS being booted is listed within a certain hierarchy of a boot menu, or the like.

If it is determined in operation 350 that the information of the OS being booted is compatible with software persistence, the information of the OS being booted is set as the information of the last successful OS in operation 355. In operation 355, the information of the OS being booted may be saved in the firmware, to a storage device of the computing device, or the like. The process proceeds to operation 325 in which software persistence is enabled.

On the other hand, if it is determined in operation 350 that the information of the OS being booted is not compatible with software persistence, the software persistence is disabled in operation 360. As an example, the firmware may not populate a WPBT table with an address of an embedded program that has been copied to a RAM of the computing device. As another example, the firmware may delete the RAM address or other information regarding the embedded program such that the OS being booted could not obtain and execute the program. In yet another example, the firmware may configure a main ACPI table such that it does not point to the WPBT and the OS is unable to obtain and execute an embedded program.

Following operation 325 in which software persistence is enabled, or following operation 360 in which software persistence is disabled, state information regarding software persistence is saved. As an example, if the determination of operation 320 indicates that the OS being booted is the primary OS such that software persistence is enabled in operation 325, the state information stored in operation 320 would indicate that the software persistence is enabled. On the other hand, if the determination of operation 320 indicates that the OS being booted is not the primary OS and the determination of operation 350 indicates that the OS being booted is not compatible with software persistence such that software persistence is disabled in operation 360, the state information stored in operation 320 would indicate that the software persistence is disabled. In either case, the firmware may save the state information by updating a variable in the firmware, by saving state information to a physical memory of the computing device, by saving state information to a storage device of the computing device, or the like. In an example, the state information may be a single bit flag stored in the firmware.

In operation 335, the computing device continues the booting process to launch the OS and begin operations.

In operation 340, it may be determined if the booting process of operation 335 is successful. In an example of operation 335, there may be an instance in which the path of the OS being booted does not correspond to a location in which an OS is installed. For example, if a booting path is erroneously selected by a user as a path that does not contain an OS, it would be determined in operation 340 that the booting was not successful.

If it is determined in operation 340 that the booting process of operation 335 is successful, the computing device ends the process. On the other hand, if it is determined in operation 340 that the booting process of operation 335 is not successful, the firmware may set a path to a next OS for booting in operation 365. After the firmware sets a path to a next OS for booting, the process returns to operation 320 and continues with subsequent operations as described above.

Figure 4A:
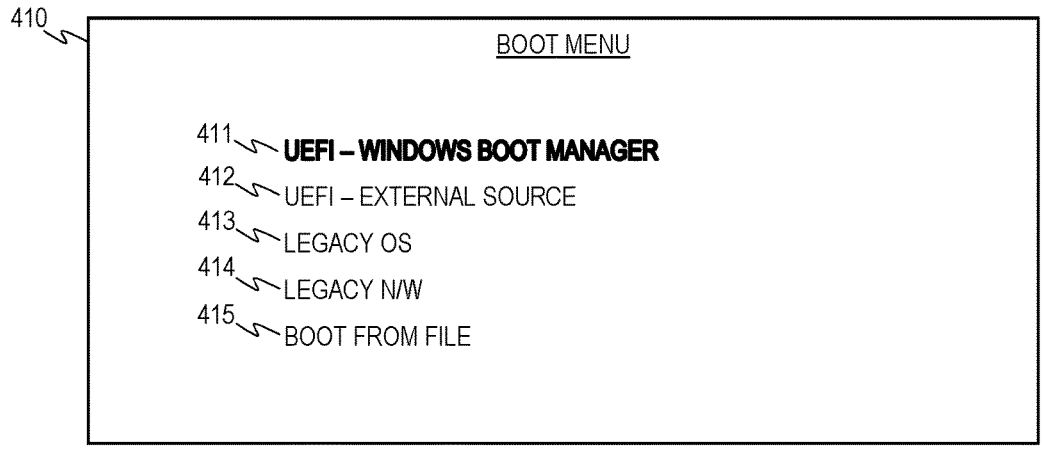
FIGS. 4A and 4B illustrate information of an operating system (OS) that may be considered when selectively disabling software persistence according to various examples.
Figure 4B:
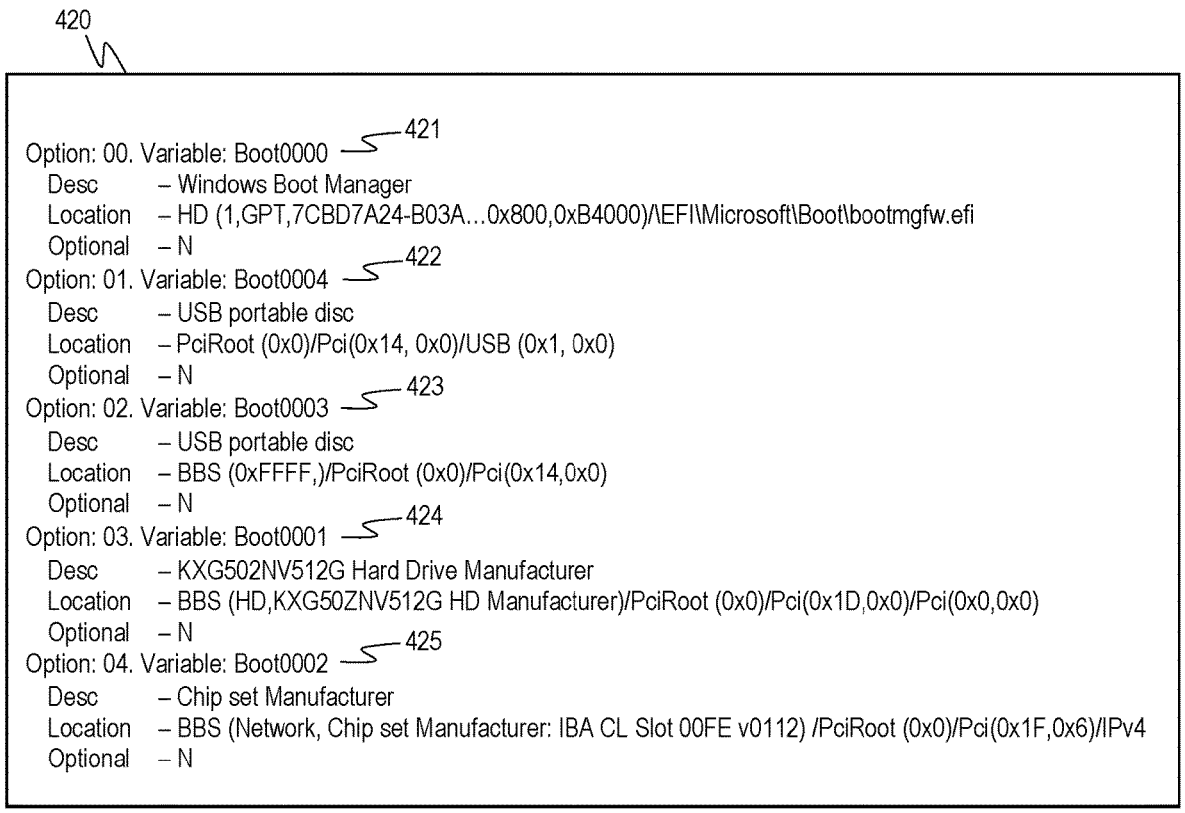

FIGS. 4A and 4B illustrate information of an OS that may be considered when selectively disabling software persistence according to various examples.

Referring to FIG. 4A, a computing device may provide a user interface from which a user may select an OS for booting. In that case, the computing device may display a screen 410 illustrating a list of bootable sources available to the computing device and highlight a selected OS. In the example of FIG. 4A, it is illustrated that the computing device operates using the Windows™ OS. In that case, the list of bootable sources may include a first source 411 of a UEFI Windows Boot Manager. In the example of FIG. 4A, the first source 411 of the UEFI Windows Boot Manager has been selected by the user and is illustrated as highlighted as compared to the other entries.

The list of bootable sources may also include a UEFI based external source 412. As an example, if a user connects a USB based external storage device including an OS stored thereon to the computing device, the list of bootable sources would display the UEFI based external source 412. The use of a USB based external storage device having an OS stored thereon may be made during a diagnostic process of the computing device. In that case, it may be desired to disable software persistence.

The list of bootable sources may further include a Legacy OS source 413. In an example, the Legacy OS source 413 may correspond to booting the computing device using an OS stored on a storage device of the computing device but in a legacy (e.g., non-UEFI) mode. In that case, because the Legacy OS source 413 may satisfy a criteria for software persistence, if the Legacy OS source 413 is selected by the user, software persistence may be enabled.

The list of bootable sources may include a Legacy network (N/W) source 414 which corresponds to an OS located on a network that is external to the computing device and operated in a legacy (e.g., non-UEFI) mode. If the Legacy N/W source 414 is selected as the OS for booting the computing device, it may be determined that the criteria for software persistence is not desired because the OS is located on an external source such that software persistence may be disabled.

The list of bootable sources may also include a Boot From File source 415 which allows a user to select an OS from a file location that may be internal or external to the computing device. In the case in which the Boot From File source 415 is selected as the source of the OS for booting, software persistence may depend on whether the file location is internal or external to the computing device. In another example, software persistence may be disabled based on the hierarchy of the Boot From File source 415 on the list of bootable sources.

Referring to FIG. 4B, a screen 420 illustrates an example of a list of information corresponding to bootable sources available to a computing device. In the example of FIG. 4B, the information may include a description of the bootable source, a location (e.g., a device path) of the bootable source, or the like. Of course, the information corresponding to the bootable source is not limited to that shown in FIG. 4B and may include more or less information corresponding to the bootable source. The list of information may include a first information 421 corresponding to the Windows Boot Manager. In the first information 421, the location or device path is pointing to a storage device having a Globally Unique Identifier (GUID), a partition starting at sector 0×800 of length 0×B4000, and a specific file corresponding to an OS. Any of this information may be used as the information of a last successful OS and/or an OS being booted in determining whether to disable software persistence.

The list of information may include a second information 422 that includes a location of a controller of an external USB device that corresponds to a UEFI based external source OS. The second information 422 may include a PCI address corresponding to the USB device as well as an address on the USB controller. The list of information may include a third information 423 that includes a location of the same external USB device as does the second information 422 but in legacy mode (e.g., non-UEFI). The list of information may include a fourth information 424 that includes a location of a disk on a non-volatile memory controller and includes a PCI address. Finally, the list of information may include a fifth information 425 that includes a location of a network device that supports internet protocol version 4 (IPv4).

Any of the first—fifth information 421-425 (e.g., location, device path, hardware information, a PCI address, etc.) may be used as the information of a last successful OS and/or an OS being booted in determining whether to disable software persistence. That is, the first—fifth information 421-425 illustrated in screen 420 may be used as information corresponding to an OS that may be used when booting the computing device. In that case, the information may be compared with stored information to determine if an OS being booted is a primary OS or if the OS being booted satisfies a criteria for software persistence.

The afore-described examples can also be embodied as a non-transitory computer-readable recording medium having recorded thereon computer-executable instructions and data. At least one of the instructions and data may be stored in the form of program code and may cause a program module to perform an appropriate operation when executed by a processor. Examples of the non-transitory computer-readable recording medium include magnetic storage media (e.g., hard disks) and optical recording media (e.g., compact discs (CDs) or digital versatile discs (DVDs)), or memories included in a server accessible through a network.

While the present disclosure has been shown and described with reference to various examples thereof, it will be understood by those skilled in the art that various changes in form and details may be made therein without departing from the spirit and scope of the present disclosure as defined by the appended claims and their equivalents. Therefore, the scope of the present disclosure should be defined not by the described examples alone, but by the appended claims and the equivalents thereof.

What is claimed is:

1. A computing device comprising:
   a storage device;
   a random-access memory;
   a read only memory; and
   a processor to:
   determine, during a booting process, whether an operating system being booted is a primary operating system, wherein the determination the operating system being booted is the primary operating system is based in part on information of the operating system being booted, and wherein the determination the operating system being booted is the primary operating system is further based on comparing hardware information corresponding to a source of the operating system being booted or a device path corresponding to a location of the operating system being booted with a list of bootable sources;
   in response to a determination that the operating system being booted is different from the primary operating system, determine whether the operating system being booted satisfies a first criteria, wherein the determination of whether the operating system being booted satisfies the first criteria is based on identifying the hardware information corresponding to the source of the operating system being booted, the device path corresponding to the location of the operating system being booted, or whether the operating system being booted is determined to be an entry on the list of bootable sources; and
   in response to a determination that the operating system being booted fails to satisfy the first criteria, disable software persistence.

2. The computing device of claim 1, wherein the processor is further to store an indicator that the software persistence is disabled.

3. The computing device of claim 1, wherein, in response to a
   determination that the operating system being booted satisfies the first criteria, the processor is further to:

store hardware information corresponding to the source of the operating system being booted or the device path corresponding to the location of the operating system being booted;
enable the software persistence; and
store an indicator that the software persistence is enabled.

4. The computing device of claim 1, wherein, when the booting process fails to complete, the processor is further to select another operating system and determine whether the other operating system satisfies the first criteria.

5. A computing device comprising:
a storage device;
a random-access memory;
a read only memory; and
a processor to:
determine, during a booting process, whether information of an operating system being booted matches information of an operating system last used to boot the computing device, wherein the determination the information of the operating system being booted fails to match the information of the operating system last used to boot the computing device is based in part on information of the operating system being booted, and wherein the determination the information of the operating system being booted fails to match the information of the operating system last used to boot the computing device is further based on comparing hardware information corresponding to a source of the operating system being booted or a device path corresponding to a location of the operating system being booted with a list of bootable sources;
in response to a determination that the information of the operating system being booted fails to match the information of the operating system last used to boot the computing device, determine if the information of the operating system being booted is compatible with software persistence, wherein the determination if the operating system being booted is compatible with software persistence is based on identifying the hardware information corresponding to the source of the operating system being booted, the device path corresponding to the location of the operating system being booted, or whether the operating system being booted is determined to be an entry on the list of bootable sources; and
in response to a determination that the information of the operating system being booted is incompatible with the software persistence, disable the software persistence.

6. The computing device of claim 5, wherein the processor is further to store an indicator that the software persistence is disabled.

7. The computing device of claim 5,
wherein, in response to a determination that the information of the operating system being booted is compatible with the software persistence, the processor is further to store the information of the operating system being booted, and
wherein the information of the operating system being booted includes the source of the operating system being booted or the device path corresponding to the location of the operating system being booted.

8. The computing device of claim 5, wherein, in response to a determination that the information of the operating system being booted is compatible with the software persistence, the processor is further to:

enable the software persistence; and
store an indicator that the software persistence is enabled.

9. The computing device of claim 5, wherein, when the booting process fails to complete, the processor is further to select another operating system and determine whether the other operating system is compatible with the software persistence.

10. A non-transitory machine-readable storage medium encoded with instructions executable by a processor, the machine-readable storage medium comprising:
instructions to determine a primary operating system of a computing device;
instructions to determine whether an operating system being booted is the primary operating system of the computing device, wherein the determination the operating system being booted is the primary operating system is further based on comparing hardware information corresponding to a source of the operating system being booted or a device path corresponding to a location of the operating system being booted with a list of bootable sources;
instructions to determine whether the operating system being booted satisfies a first criteria, wherein the determination the operating system being booted satisfies the first criteria is based in part on information of the operating system being booted, and wherein the determination of whether the operating system being booted satisfies the first criteria is based on identifying the hardware information corresponding to the source of the operating system being booted, the device path corresponding to the location of the operating system being booted, or whether the operating system being booted is determined to be an entry on the list of bootable sources; and
instructions to, in response to a determination that the operating system being booted is other than the primary operating system or fails to satisfy the first criteria, disable software persistence.

11. The machine-readable storage medium of claim 10, further comprising instructions to store an indicator that the software persistence is disabled.

12. The machine-readable storage medium of claim 10, further comprising instructions to, in response to a determination that the operating system being booted satisfies the first criteria, store the hardware information corresponding to the source of the operating system being booted or the device path corresponding to the location of the operating system being booted.

13. The machine-readable storage medium of claim 12, further comprising instructions to, in response to the determination that the operating system being booted satisfies the first criteria:
instructions to enable the software persistence; and
instructions to store an indicator that the software persistence is enabled.

14. The machine-readable storage medium of claim 10, wherein the instructions to determine whether the operating system being booted is the primary operating system comprise instructions to compare hardware information corresponding to a source of the operating system being booted or a device path corresponding to a location of the operating system being booted with stored information.

* * * * *